UNITED STATES PATENT OFFICE.

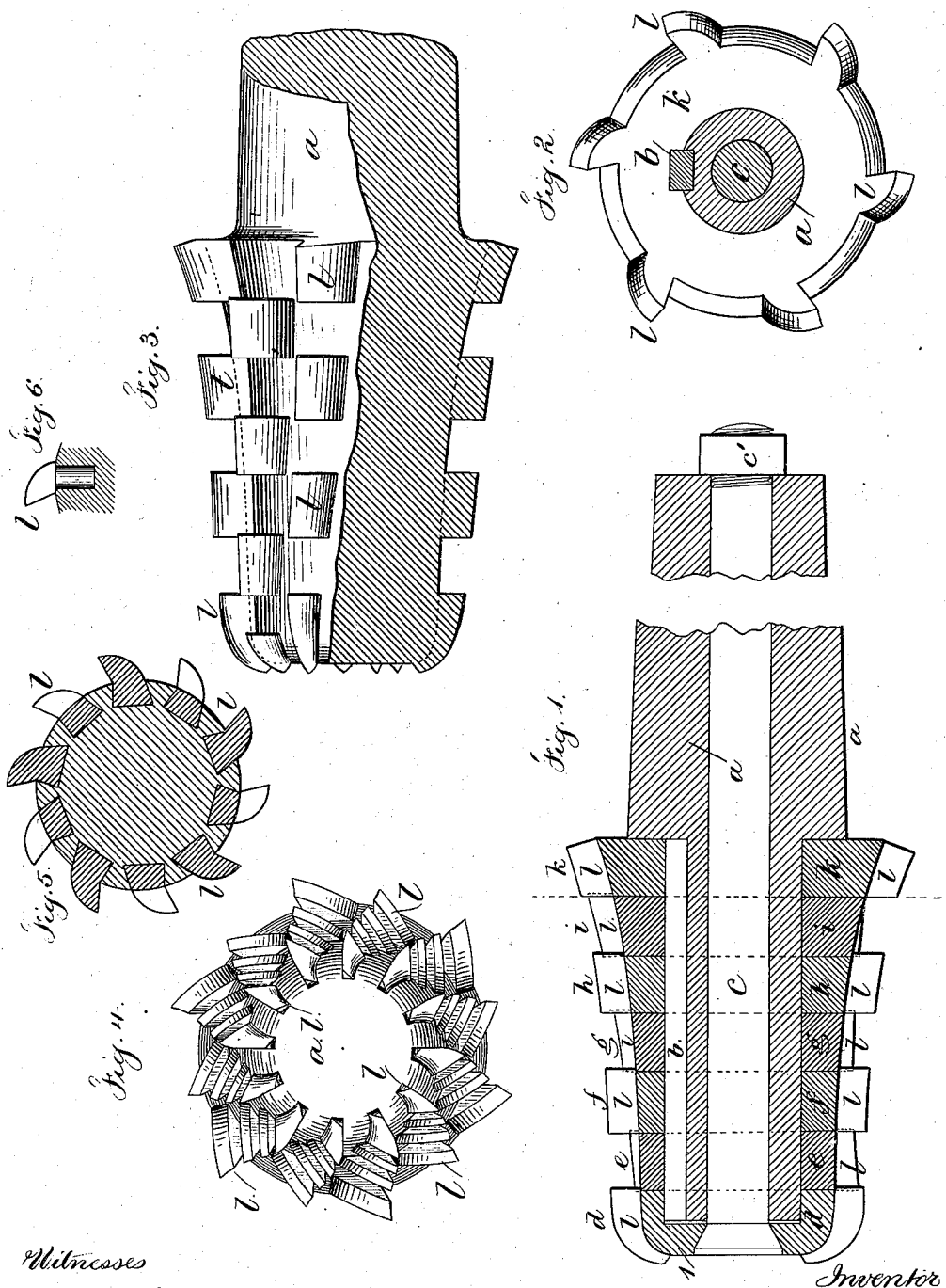

SIDNEY BROADBENT, OF SCRANTON, PENNSYLVANIA.

MILLING-CUTTER.

SPECIFICATION forming part of Letters Patent No. 294,192, dated February 26, 1884.

Application filed August 20, 1883. (No model.)

*To all whom it may concern:*

Be it known that I, SIDNEY BROADBENT, of Scranton, in the county of Lackawanna and State of Pennsylvania, have invented a new and useful Improvement in Milling-Tools; and the following is declared to be a description of the same.

Milling-tools are employed for removing surplus portions of metal in the construction of machinery, and especially are they used for cutting the teeth of gear-wheels. These milling-tools are revolved by suitable machinery, and in the act of cutting or smoothing the teeth the tool is moved across the face of the wheel.

Heretofore it has been usual to employ planing or slotting machines to rough out the teeth of large gears, and then finish with a fluted milling-tool of proper shape. Milling-tools to cut and partly rough have been employed; but these left ribs which had to be chipped out. These milling-tools and their teeth or cutting-edges have generally been formed out of one piece of metal. The teeth upon these milling-tools are usually parallel with the axis of the tool, the tool for roughing out being made with annular grooves, with teeth in the intermediate rings, and the finishing-tool having teeth the whole length of the cutting-surface.

My invention has for its object a milling-tool that will not vibrate or chatter when in use, and which will produce a smooth surface. In this tool a line drawn through the cutting-edges of the teeth will be at an angle to the axis of the tool, thereby giving the teeth a shearing cut; and my invention has further for its object the forming of teeth in milling-tools in rings or sections, so that the teeth shall alternate with each other, but they will act upon the whole of the surface that is to be milled without having any fin or unfinished part upon the surface. These alternating teeth may, however, be made solid with the milling-tool; or they may be let into the surface of the said milling-tool either in a dovetailed slot or be secured by shanks driven into holes in said tool-stock. This form of milling-tool has been called a "staggered milling-tool."

In the drawings, Figure 1 is a longitudinal section of my improved milling-tool. Fig. 2 is a cross-section of the stock, with one ring in elevation. Fig. 3 is an elevation and partial section of a milling-tool wherein the teeth are made solid with the tool-stock. Fig. 4 is an end view of the tool shown in Fig. 3, and Figs. 5 and 6 are sections showing the teeth and the devices for holding them.

In Fig. 1, $a$ is the spindle of the milling-tool. $b$ is a key in a slot in said tool, and $c$ is a tie-bolt passing through the spindle, for securing the tooth-rings in place. The tooth-rings $d\ e\ f\ g\ h\ i\ k$ have each a central opening for the spindle $a$, and a slot in their inner circumference for the key $b$. The outer circumference of each ring is made with teeth $l$, having cutting-edges inclined at an angle to the axis of the milling-tool. The cutting-teeth on ring $d$ are made with curved edges, to finish out the metal at the basis of the gear-teeth, and also the surface of the wheel between the teeth. The rings $d\ e\ f\ g\ h\ i\ k$ and the teeth $l$ upon their surfaces are of any desired size for dressing the surfaces of the gear-teeth, and the slots or seats for the key $b$ are cut in such positions that when the rings are threaded upon the spindle the teeth $l$ of one ring will alternate with those of the next ring. The head of the tie-bolt $c$ takes a bearing against the annular end 1 of ring $d$, and the nut $c'$ tightens such bolt and causes the head to clamp the rings securely in place. The key $b$ prevents the toothed rings from turning when in use. One side or surface of each of the aforesaid toothed rings is turned off about one thirty-second of an inch deep and inside of the basis of the projecting teeth. This is done so that when the rings are put together upon the spindle their faces shall come firmly together, and the edges of each set of teeth shall overlap upon the next ring, so that there will not be any fin or ridge in the surfaces of the finished gear-teeth, the edges of one range of cutters overlapping the path described by the next edge of cutters, so as to make a smooth finish in the metallic surface.

In Figs. 3 and 4 the teeth $l$ are represented as alternating in position, and the teeth as wider than the space between one tooth and the next. The cutting-edges are inclined to the axis of the spindle, similar to those in the milling-tool shown and described with reference to Figs. 1 and 2; but in Figs. 3 and 4 the teeth are shown as solid with the spindle. These teeth $l$, instead of being made solid with the spindle, or formed upon rings threaded upon a spindle, may be made, as shown in Fig. 5, with shanks let into dovetailed slots in the spindle, or with cylindrical shanks, and driven into holes in the spindle, as in Fig. 6.

A milling-tool made in the form described, having teeth placed alternately with inclined cutting-edges, and with the teeth wider than the spaces between the ranges of teeth, is the main feature of my invention. This form of milling-tool can be used alone to do the work formerly accomplished by both the roughing and finishing tools, as it is capable of cutting or smoothing the teeth at one operation.

I claim as my invention—

1. A milling-tool composed of disks or rings with teeth upon their edges, each tooth being longer on its edge than the thickness of the disk, and said disks secured together upon a spindle, with the teeth on one disk between the teeth upon the next disk, substantially as set forth.

2. The combination, in a milling-tool, of the spindle $a$, key $b$, and tie-bolt $c$, with movable rings, each of which is provided with teeth that are wider than the thickness of the ring, and at an inclination, as specified.

3. The milling-tool having peripheral teeth in rows, the teeth in one row alternating with those in the next, and the edge of each tooth being at an inclination and longer than the distance between one tooth and the next, substantially as set forth.

Signed by me this 14th day of August, A. D. 1883.

SIDNEY BROADBENT.

Witnesses:
J. M. POORE,
E. F. BOYLE.